United States Patent
Ljung et al.

(10) Patent No.: US 9,596,103 B2
(45) Date of Patent: Mar. 14, 2017

(54) INTERFERENCE CANCELING FOR MOBILE DEVICES

(71) Applicant: Sony Corporation, Tokyo (JP)

(72) Inventors: Rickard Ljung, Helsingborg (SE); Olof Zander, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/906,749

(22) PCT Filed: Jul. 10, 2014

(86) PCT No.: PCT/IB2014/062992
§ 371 (c)(1),
(2) Date: Jan. 21, 2016

(87) PCT Pub. No.: WO2015/011595
PCT Pub. Date: Jan. 29, 2015

(65) Prior Publication Data
US 2016/0156486 A1 Jun. 2, 2016

Related U.S. Application Data

(63) Continuation of application No. 13/950,352, filed on Jul. 25, 2013, now abandoned.

(51) Int. Cl.
*H04B 1/38* (2015.01)
*H04L 25/03* (2006.01)
(Continued)

(52) U.S. Cl.
CPC ....... *H04L 25/03006* (2013.01); *H04B 1/525* (2013.01); *H04B 1/0475* (2013.01);
(Continued)

(58) Field of Classification Search
CPC .......... H04B 1/525; H04B 1/40; H04B 15/00; H04B 1/56; H04B 1/0475; H04B 7/00;
(Continued)

(56) References Cited

U.S. PATENT DOCUMENTS

| 4,660,042 | A | * | 4/1987 | Ekstrom | ................ | H04B 1/525 |
| | | | | | | 342/13 |
| 8,520,694 | B1 | * | 8/2013 | Bali | ........................ | H04L 12/12 |
| | | | | | | 370/318 |

(Continued)

OTHER PUBLICATIONS

International Search Report and Written Opinion from corresponding International Patent Application No. PCT/IB2014/062992, mailed Dec. 2, 2014.

*Primary Examiner* — Leila Malek
(74) *Attorney, Agent, or Firm* — Tucker Ellis LLP

(57) ABSTRACT

A user-device implemented method includes encoding a first digital signal to generate a first digital baseband signal and modulate the first digital baseband signal to generate one or more RF signals corresponding to one or more frequency bands. The one or more RF signals are transmitted via one or more antennas. Substantially simultaneously with the transmission of the one or more RF signals, a second one or more RF signals is received via the one or more antennas. The second one or more RF signals are demodulated to generate a second digital baseband signal. The first digital baseband signal is subtracted from the second digital baseband signal to generate a modified second digital baseband signal.

14 Claims, 5 Drawing Sheets

(51) Int. Cl.
  *H04B 1/525* (2015.01)
  *H04B 1/04* (2006.01)
  *H04B 7/00* (2006.01)
  *H04B 1/40* (2015.01)
  *H04B 15/00* (2006.01)
  *H04B 1/56* (2006.01)

(52) U.S. Cl.
  CPC .................. *H04B 1/40* (2013.01); *H04B 1/56* (2013.01); *H04B 7/00* (2013.01); *H04B 15/00* (2013.01)

(58) Field of Classification Search
  CPC ........ H04B 7/15585; H04B 1/10; H04B 1/44; H04L 5/1461; H04L 5/14; H04L 27/2626; H04L 27/2647; H04W 72/0413; H04W 72/042
  USPC ......... 370/277, 278, 430; 375/148, 346, 219
  See application file for complete search history.

(56) References Cited

U.S. PATENT DOCUMENTS

| | | |
|---|---|---|
| 2004/0048576 A1 | 3/2004 | Hildebrand et al. |
| 2010/0195543 A1* | 8/2010 | Jung .................. H04B 7/15585 370/279 |
| 2011/0081932 A1* | 4/2011 | Astely ..................... H04L 5/001 455/509 |
| 2011/0149714 A1 | 6/2011 | Rimini et al. |
| 2012/0182874 A1* | 7/2012 | Siomina .............. H04W 56/004 370/241 |
| 2012/0295558 A1 | 11/2012 | Wang et al. |
| 2013/0044791 A1 | 2/2013 | Rimini et al. |

* cited by examiner

INTERFERENCE CANCELING FOR MOBILE DEVICES

TECHNICAL FIELD

The present invention relates to wireless communication devices, and more particularly, interference handling in such wireless communication devices.

BACKGROUND ART

In operation, a wireless communication devices use a portion of a particular radio frequency spectrum for wirelessly transmitting and receiving information. Regulatory bodies control the particular frequency spectra for mobile communication systems, and detailed definition typically made by standardization organizations. However, in general, each spectrum is divided into different frequency bands, with each band defined as a portion/range of the various frequencies allocated for certain type of usage, either licensed to a specific network operator or unlicensed for usage by anyone.

In modern wireless systems, frequency bands can be defined in order to operate in one out of two principal modes: time division duplex (TDD) or frequency division duplex (FDD). In a time division based system, each mobile terminal (e.g., user device) and/or base station in the communication system uses one single radio frequency range for both signal transmissions and receptions. To avoid direct interference between transmitted and received signals, each terminal is switched in time between transmission and reception functions. In a frequency division mode, two different frequency ranges are allocated for transmission and reception respectively. Accordingly, mobile terminals using FDD can transmit and receive signals simultaneously. In this manner the transmitted signal from the terminal antenna(s) will not interfere with the signals to be received in the same physical antenna(s) although the transmitter and receiver are operating at the same time.

Examples of frequency band definitions include frequency bands defined by the 3rd Generation Partnership Project (3GPP) for usage in wideband code division multiple access (WCDMA) and LTE systems. The bands are defined in 3GPP TS 25.101 and 36.101.

A recent development in wireless communication systems includes the usage of multiple frequency bands for simultaneous transmission between a base station and a terminal. Generally speaking, the concept is referred to as multi-carrier operation or carrier aggregation. The term "carrier" in this description refers to a carrier or center frequency of a particular frequency band. When utilizing carrier aggregation, the communication system can be configured to combine spectra from two or more bands into one larger aggregated spectrum resource. This can be done in many different configurations, e.g., by combining two or more bands for additional base station to terminal (e.g., downlink) bandwidth and/or by combine bands for terminal to base station (e.g., uplink) aggregation.

Unfortunately, a potential consequence of carrier aggregation may be intra-device interference, occurring between simultaneously transmitted and received signals.

SUMMARY

According to one aspect, a user device includes a communication interface; and one or more processors, wherein the communication interface is configured to: receive, from the one or more processors, a transmit digital signal for transmission as one or more radio frequency (RF) signals; encode the transmit digital signal to generate a transmit digital baseband signal; modulate the transmit digital baseband signal to generate the one or more RF signals; transmit, by a transmitter, the one or more radio frequency signals via one or more antennas; receive, by a receiver, and substantially simultaneously with the transmission of the one or more RF signals, a second one or more RF signals via the one or more antennas; demodulate the second one or more RF signals to generate a receive digital baseband signal; subtract, by an interference canceling unit, potentially interfering effects of the one or more radio frequency (RF) signals based on the transmit digital baseband signal from the receive digital baseband signal to generate a modified receive digital baseband signal; decode the modified receive digital baseband signal to generate a decoded receive digital signal; and forward the decoded receive digital signal to the one or more processors.

Additionally, the at least one of the one or more radio frequency RF signals and the second one or more frequency RF signals include RF signals in more than one frequency band.

Additionally, the more than one frequency band include a first uplink band and a second downlink band, wherein the first uplink band has at least one harmonic in an interfering frequency range corresponding to the second downlink band.

Additionally, the interference canceling unit is further configured to: receive the transmit digital baseband signal; and generate a potentially interfering signal based on some or all of the transmit digital baseband signal, wherein the potentially interfering effects are subtracted from the receive digital baseband signal based on the potentially interfering signal.

Additionally, the interference canceling unit is configured to generate the potentially interfering signal by identifying time delay and/or phase shifts occurring from the transmitter to the receiver.

Additionally, the receive digital baseband signal includes more than one signal corresponding to more than one downlink frequency band, and wherein the interference canceling unit is further configured to: subtract the potentially interfering signal from fewer than all of the more than one receive digital baseband signals.

Additionally, the user device comprises a mobile communication device having telephone or data network capabilities.

Additionally, the user device is configured to support carrier aggregation of more than one carrier frequency band for uplink and/or downlink.

According to another aspect, a mobile communication device-implemented method, includes: encoding a first digital signal to generate a first digital baseband signal; modulating the first digital baseband signal to generate one or more RF signals corresponding to one or more frequency bands; transmitting the one or more RF signals via one or more antennas; receiving, substantially simultaneously with the transmitting of the one or more RF signals, a second one or more RF signals via the one or more antennas; demodulating the second one or more RF signals to generate a second digital baseband signal; and subtracting the first digital baseband signal from the second digital baseband signal to generate a modified second digital baseband signal.

Additionally, at least one of the one or more radio frequency RF signals and the second one or more frequency RF signals include RF signals in more than one frequency band.

Additionally, the more than one frequency band include a first uplink band and a second downlink band, wherein the first uplink band includes at least one component that potential interferes with the second downlink band.

Additionally, the at least one component comprises at least one harmonic of a carrier frequency range of the first uplink band.

Additionally, the method further includes receiving the first digital baseband signal by an interference canceling unit; and generating a potentially interfering signal based on some or all of the first digital baseband signal, wherein subtracting the first digital baseband signal comprises subtracting the potentially interfering signal from the second digital baseband signal.

Additionally, the method further includes generating the potentially interfering signal by identifying time delay and/or phase shifts occurring between transmitting the first one or more RF signals and receiving the second one or more RF signals.

Additionally, the second digital baseband signal includes two or more second digital baseband signals corresponding to two or more downlink frequency bands, and subtracting the potentially interfering signal from fewer than all of the two or more second digital baseband signals.

According to yet another aspect, a non-transitory computer-readable medium containing instructions executable by at least one processor, for causing the at least one processor to: encode a first digital signal to generate a first digital baseband signal; modulate the first digital baseband signal to generate one or more RF signals corresponding to one or more frequency bands; transmit the one or more RF signals via one or more antennas; receive, substantially simultaneously with the transmission of the one or more RF signals, a second one or more RF signals via the one or more antennas; demodulate the second one or more RF signals to generate a second digital baseband signal; and subtract the first digital baseband signal from the second digital baseband signal to generate a modified second digital baseband signal.

Additionally, at least one of the one or more radio frequency RF signals and the second one or more frequency RF signals include RF signals in more than one frequency band.

Additionally, the more than one frequency band include a first uplink band and a second downlink band, wherein the first uplink band includes at least one component that potential interferes with the second downlink band.

Additionally, the computer-readable medium includes one or more instructions executable by at least one processor, that cause the at least one processor to: receive the first digital baseband signal; and generate a potentially interfering signal based on some or all of the first digital baseband signal, wherein the instructions that cause the at least one processor to subtract the first digital baseband signal further cause the at least one processor to subtract the potentially interfering signal from the second digital baseband signal.

Additionally, the computer-readable medium further includes one or more instructions executable by at least one processor, that cause the at least one processor to: generate the potentially interfering signal by identifying time delay and/or phase shifts occurring between transmitting the first one or more RF signals and receiving the second one or more RF signals.

BRIEF DESCRIPTION OF DRAWINGS

The accompanying drawings, which are incorporated in and constitute a part of this specification, illustrate one or more embodiments described herein and, together with the description, explain the embodiments. In the drawings.

DESCRIPTION OF EMBODIMENTS

The following detailed description refers to the accompanying drawings. The same reference numbers in different drawings may identify the same or similar elements. The same reference numbers in different drawings identify the same or similar elements. Also, the following detailed description does not limit the invention. Instead, the scope of the invention is defined by the appended claims and equivalents.

As described herein, a user device, such as a mobile device, a portable device, or a handheld device, may perform transmitter-to-receiver interference canceling to enable implementation of carrier aggregation using otherwise impracticable combinations of carrier frequency bands. According to an exemplary embodiment, when transmitting, the user device determines potentially any interfering signals based on the transmission of a data signal (e.g., to a base station or other device). The user device then, based on this determination, generates an interfering signal for use in canceling the transmitter-based interference effects in a simultaneously received signal. Upon receipt of one or more signals, substantially simultaneously with the transmission of the data signal, the user device is configured to subtract the interference effects by subtracting the generated interfering signal from the received signal.

Figure 1:
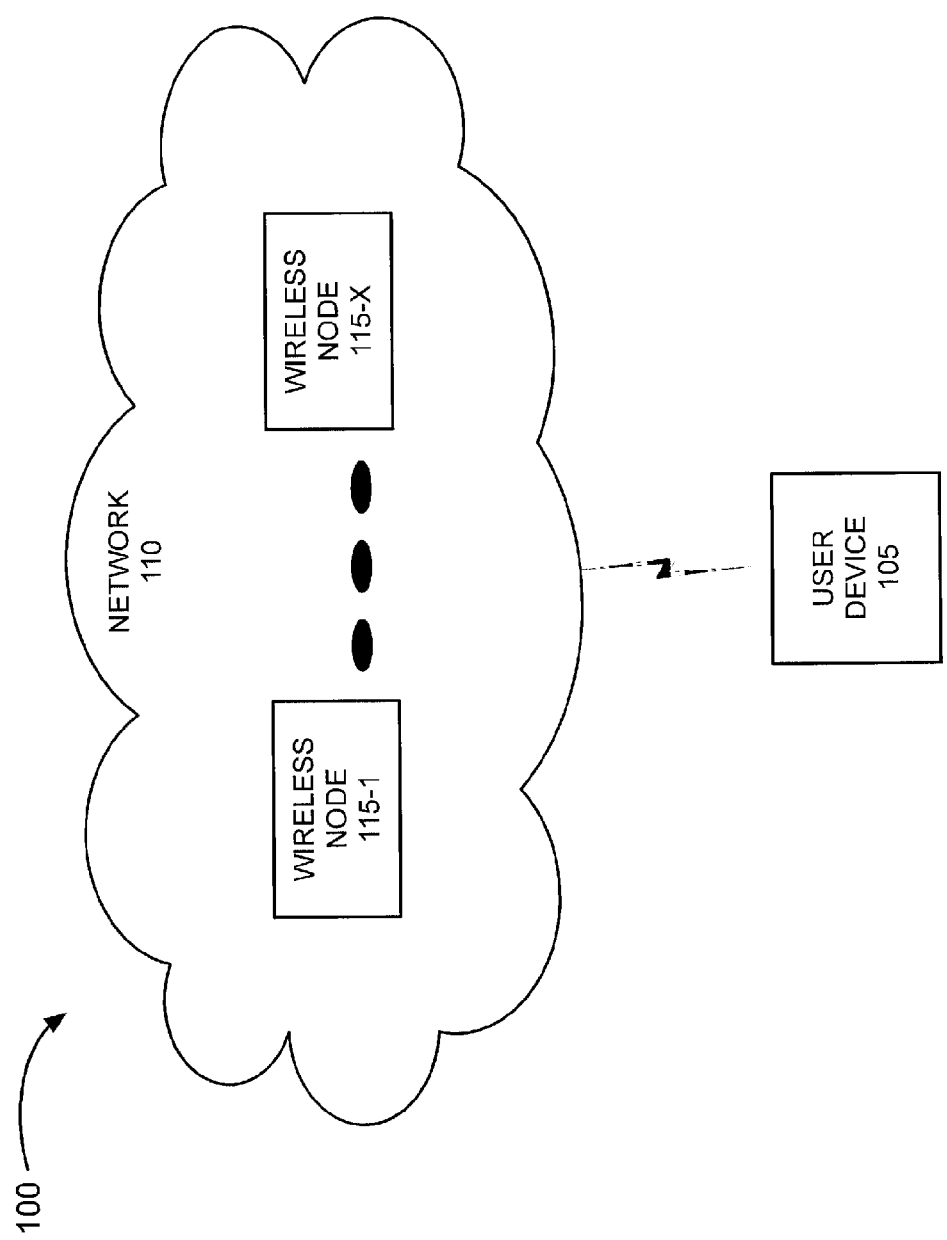
FIG. 1 is a diagram illustrating an exemplary environment in which embodiments described herein may be implemented.

FIG. 1 is a diagram illustrating an exemplary environment in which embodiments described herein may be implemented. Environment 100 includes a user device 105 and a network 110. Network 110 includes wireless nodes 115-1 through 115-X, in which X>1 (also referred to collectively as wireless nodes 115 or individually as wireless node 115) and network device 120.

The number of devices and the configuration of devices and networks in environment 100 are exemplary. According to other embodiments, environment 100 may include additional devices, fewer devices, different devices, and/or differently arranged devices, than those illustrated in FIG. 1. Additionally, according to other embodiments, environment 100 may include additional networks According to other embodiments, a single device illustrated in FIG. 1A may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and may involve intermediary device(s) and/or network(s) not illustrated in FIG. 1. Additionally, the number and the arrangement of connections between the devices and the network are exemplary.

According to an exemplary embodiment, user device 105 comprises a portable device, a mobile device, a wrist-worn device, or a handheld computing device that operates as described herein. By way of example, user device 105 may be implemented as a smart phone, a wireless telephone (e.g., a cellphone, etc.), a personal digital assistant (PDA), a data organizer, a picture capturing device, a video capturing device, a Web-access device, a music playing device, a location-aware device, a gaming device, a computing device, and/or some other type of user communication device (e.g., a vehicular-based device, etc.). As described below, according to an exemplary embodiment, user device 105 comprises interference-handling components for reducing or eliminating the effects of carrier aggregation based interference resulting from connections with network 110.

Network 110 includes one or multiple networks. For example, network 110 includes a wireless network (e.g., mobile network, cellular network, non-cellular network, an ad hoc network, etc.). By way of example, network 110 may be implemented as a Long Term Evolution (LTE) network, an evolved High Rate Packet Data (eHRPD) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, a Code Division Multiple Access (CDMA)-based network, or some combination thereof.

Wireless node 115 comprises a device that wirelessly communicates with user device 105. By way of example, wireless node 115 may be implemented as an evolved Node B (eNB), a base station (BS), a base station controller (BSC), a Node B, a base transceiver station (BTS), a relay node, a repeater, a home eNB (HeNB), a home node B (HNB), an edge node, a radio node, or a microwave node. Wireless node may support one access and/or wireless technology or multiple access and/or wireless technologies.

Furthermore, wireless node 115 may include one or more network devices that are configured to respond to access requests from user device 105, negotiate access to user device 105 on one or more frequency channels, and forward information from user device 105 to one or more additional elements within network 110.

Consistent with embodiments described herein, wireless nodes 115 and user device 105 may each be configured to support carrier aggregation communication in which two or more frequency bands are combined for uplink, downlink, or both between user device 105 and wireless nodes 115.

As used herein, carrier aggregation refers to a component of the LTE-Advanced specification (i.e., in which a number of different carrier signals (also referred to as component carriers) are combined to provide high uplink and downlink bandwidths. More specifically, each component carrier can have a bandwidth of 1.4, 3, 5, 10, 15 or 20 MHz and as many as five component carriers can be aggregated together, resulting in an maximum aggregated bandwidth of 100 MHz.

Carrier aggregation can be used for both frequency domain division (FDD) and time domain division (TDD) architectures. In FDD, the number of aggregated carriers can be different for the downlink carriers and the uplink carriers, and each carrier may be of different bandwidths. In TDD, the number of component carriers for uplink and downlink and the bandwidth of each carrier must be the same. Carrier aggregation can be performed intra-band contiguous, in which contiguous component carriers are aggregated together, or inter-band, in which a frequency gap is provided between the aggregated carriers.

In addition to transmitting using the carrier aggregated frequencies, RF transmissions also include harmonics of the transmitted signals at integer multiples of the carrier frequency. For example, FDD uplink band 17 transmits in the range of 704 to 716 MHz. Thus, a first harmonic occurs at 2×(704-716), which results in a first harmonic range of 1408 to 1432 MHz. Similarly, a second harmonic occurs at 3×(704-716), which results in a second harmonic range of 2112 to 2148 MHz.

As described in additional detail below, these harmonics of the carrier frequency may interfere with aggregated carrier signals used for downlink. For example, an aggregated carrier that includes FDD band 4 signals in the range of 2110 to 2155 MHz may interfere with the second harmonic of a band 17 uplink carrier, which is output in the range of 2112 to 2148 MHz.

Typically, non-aggregated carriers are used in pair bands such that uplink and downlink frequencies are in non-overlapping or non-interfering ranges. For example, FDD band 17 has an uplink range of 1920-1980 MHz and a downlink range of 2110-2170 MHz. For TDD, uplink carriers and downlink carriers share a common frequency range, however are time separated to avoid interference. However, with carrier aggregation increasing the usable combinations of different carriers, the possibility of conflicting or interfering frequencies increases significantly, particularly considering harmonics of transmission frequencies. Embodiments described herein may ameliorate the deleterious effects of such interference without restricting the bands capable of being aggregated.

Figure 2:
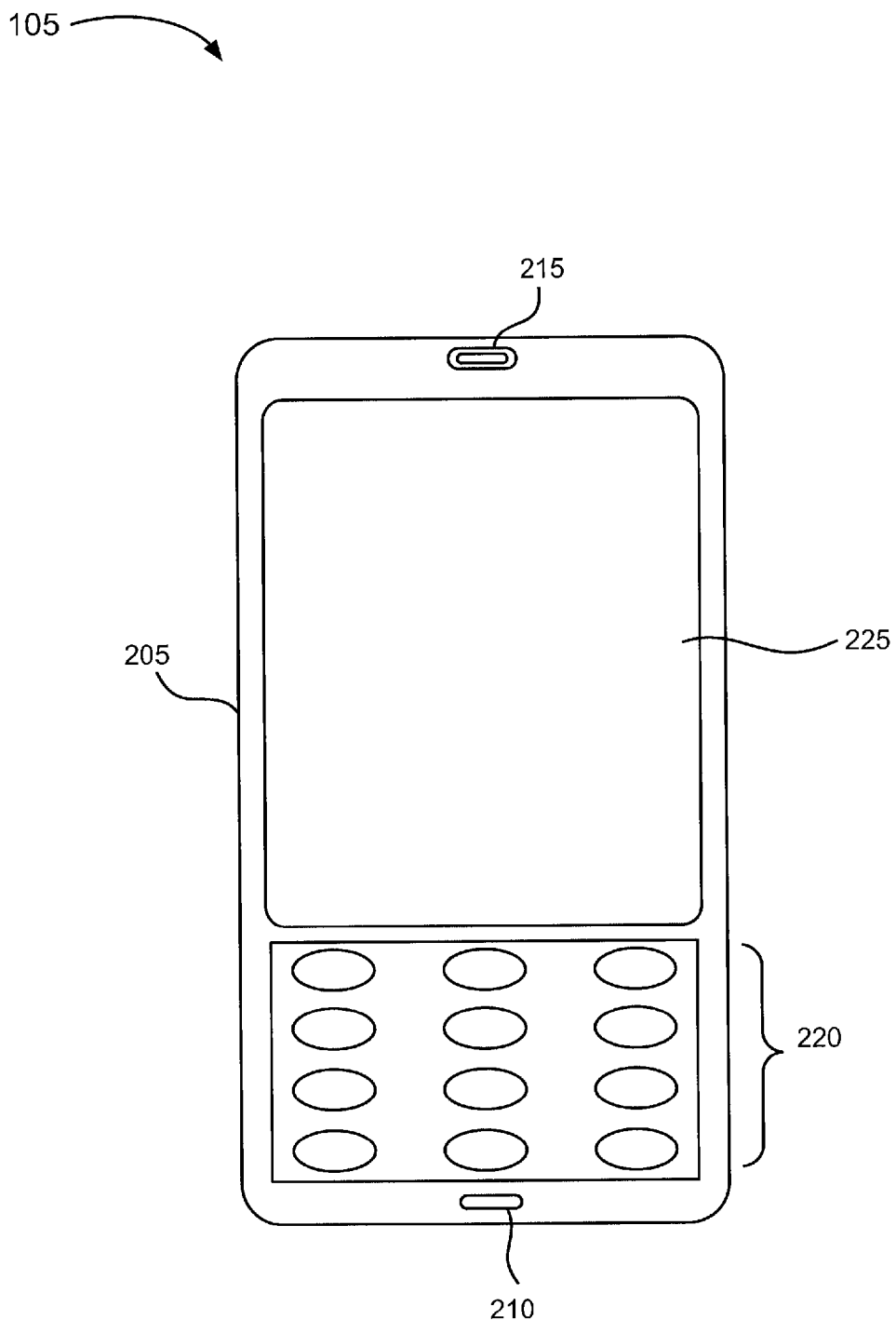
FIG. 2 is a diagram illustrating exemplary components of the user device of FIG. 1.

FIG. 2 is a diagram illustrating exemplary components of user device 105. As illustrated in FIG. 2, user device 105 may comprise a housing 205, a microphone 210, a speaker 215, keys 220, and a touch display 225. According to other embodiments, user device 105 may comprise fewer components, additional components, different components, and/or a different arrangement of components than those illustrated in FIG. 2 and described herein.

Housing 205 comprises a structure to contain components of user device 105. For example, housing 205 may be formed from plastic, metal, or some other type of material. Housing 205 structurally supports microphone 210, speaker 215, keys 220, and touch display 225.

Microphone 210 comprises a microphone. For example, a user may speak into microphone 210 during a telephone call, speak into microphone 210 to execute a voice command, to execute a voice-to-text conversion, etc. Speaker 215 comprises a speaker. For example, a user may listen to music, to a calling party, etc., through speakers 215.

Keys 220 comprise keys, such as push-button keys or touch-sensitive keys. Keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send a message, place a call, open an application, etc.) and/or allow a user to select and/or navigate through user interfaces or other content displayed by touch display 225. Touch display 225 comprises a display having touch capabilities and/or touchless capabilities (e.g., air touch, air-gesture).

Figure 3:
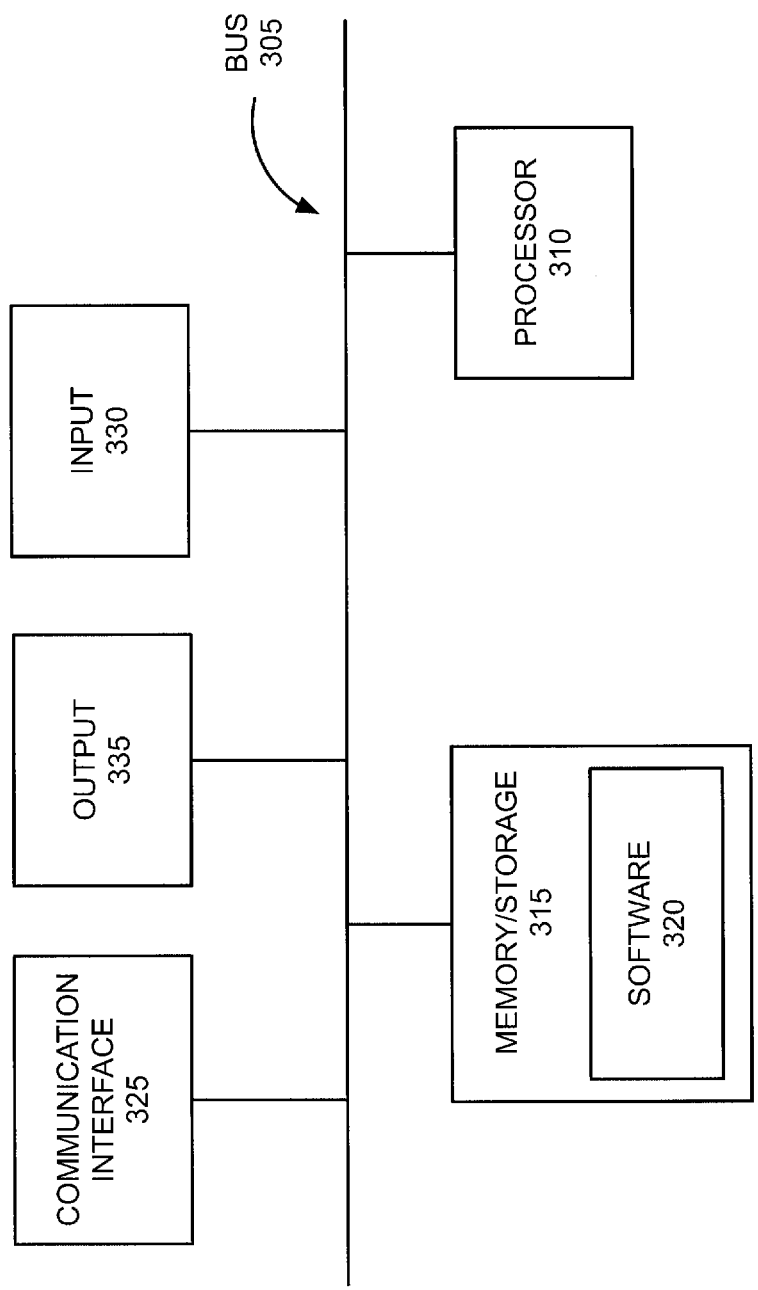
FIG. 3 is a diagram illustrating exemplary components of a device of FIG. 1.

FIG. 3 is a diagram illustrating exemplary components of a device 300 depicted in FIG. 1. For example, device 300 may correspond to user device 105 and/or wireless node 115. As illustrated, device 300 comprises a bus 305, a processor 310, memory/storage 315 that comprises software 320, a communication interface 325, an input 330, and an output 335. According to other embodiments, device 300 may comprise fewer components, additional components, different components, and/or a different arrangement of components than those illustrated in FIG. 3 and described herein.

Bus 305 comprises a path that permits communication among the components of device 300. For example, bus 305 may comprise a system bus, an address bus, a data bus, and/or a control bus. Bus 305 may also include bus drivers, bus arbiters, bus interfaces, and/or clocks.

Processor 310 comprises a processor, a microprocessor, a data processor, a co-processor, an application specific integrated circuit (ASIC), a system-on-chips (SOC), an application specific instruction-set processor (ASIP), a controller, a programmable logic device (PLD), a chipset, a field programmable gate array (FPGA), and/or some other processing logic that may interpret and/or execute instructions and/or data. Processor 310 may control the overall operation, or a portion of operation(s) performed by device 300. For example, processor 310 may perform operations based on an operating system, various applications, and/or programs (e.g., software 320). Processor 310 may access instructions from memory/storage 315, from other components of device 300, and/or from a source external to device 300 (e.g., another device or a network).

Memory/storage 315 comprises a memory and/or other type of storage medium. For example, memory/storage 315 may comprise one or multiple types of memories, such as, a random access memory (RAM), a dynamic random access memory (DRAM), a cache, a static random access memory (SRAM), a read only memory (ROM), a programmable read only memory (PROM), a ferroelectric random access memory (FRAM), an erasable programmable read only memory (EPROM), s static random access memory (SRAM), a flash memory, and/or some other form of hardware for storing. Memory/storage 315 may comprise a hard disk (e.g., a magnetic disk, an optical disk, a magneto-optic disk, a solid state disk, etc.) and a corresponding drive. Memory/storage 315 may be external to and/or removable from device 300, such as, for example, a Universal Serial Bus (USB) memory, a dongle, etc. Memory/storage 315 may store data, software 320, and/or instructions related to the operation of device 300.

Software 320 comprises software, such as, for example, an operating system and, application(s) and/or program(s). Software may comprise firmware. By way of example, in the case that device 300 corresponds to user device 105, software 320 may comprise a telephone application, a voice recognition application, a multi-media application, a texting application, an instant messaging application, etc. According to an exemplary embodiment, user device 105 includes software configured to provide carrier aggregation interference handling, as described herein.

Communication interface 325 comprises a wireless communication interface. For example, communication interface 325 comprises one or more antennas and a transmitter that converts baseband signals from processor 310 to radio frequency (RF) signals for output via an antenna, and a receiver that may converts RF signals from the antenna to baseband signals. Alternatively, communication interface 325 may include a transceiver that performs the functions of both a transmitter and a receiver. Communication interface 325 may operate according to one or multiple protocols, communication standards, or the like. Communication interface 325 permits device 300 to communicate with other devices, networks, and/or systems, such as wireless nodes 115.

Input 330 permits an input into the device. For example, input 330 may comprise a keypad (e.g., keys 220), a display (e.g., touch display 225), a touch pad, a button, a switch, a microphone (e.g., microphone 210), an input port, a knob, and/or some other type of input component. Output 335 permits the device to provide an output. For example, output 335 may include a display (e.g., touch display 225), a speaker (e.g., speakers 215), a light emitting diode (LED), an output port, a vibratory mechanism, or some other type of output component.

Device 300 may perform operations or processes in response to processor 310 executing instructions (e.g., software 320) stored by memory/storage 315. For example, the instructions may be read into memory/storage 315 from another storage medium or from another device via communication interface 325. The instructions stored by memory/storage 315 may cause processor 310 to perform various operations or processes. Alternatively, the device may perform processes based on the execution of hardware.

Figure 4:
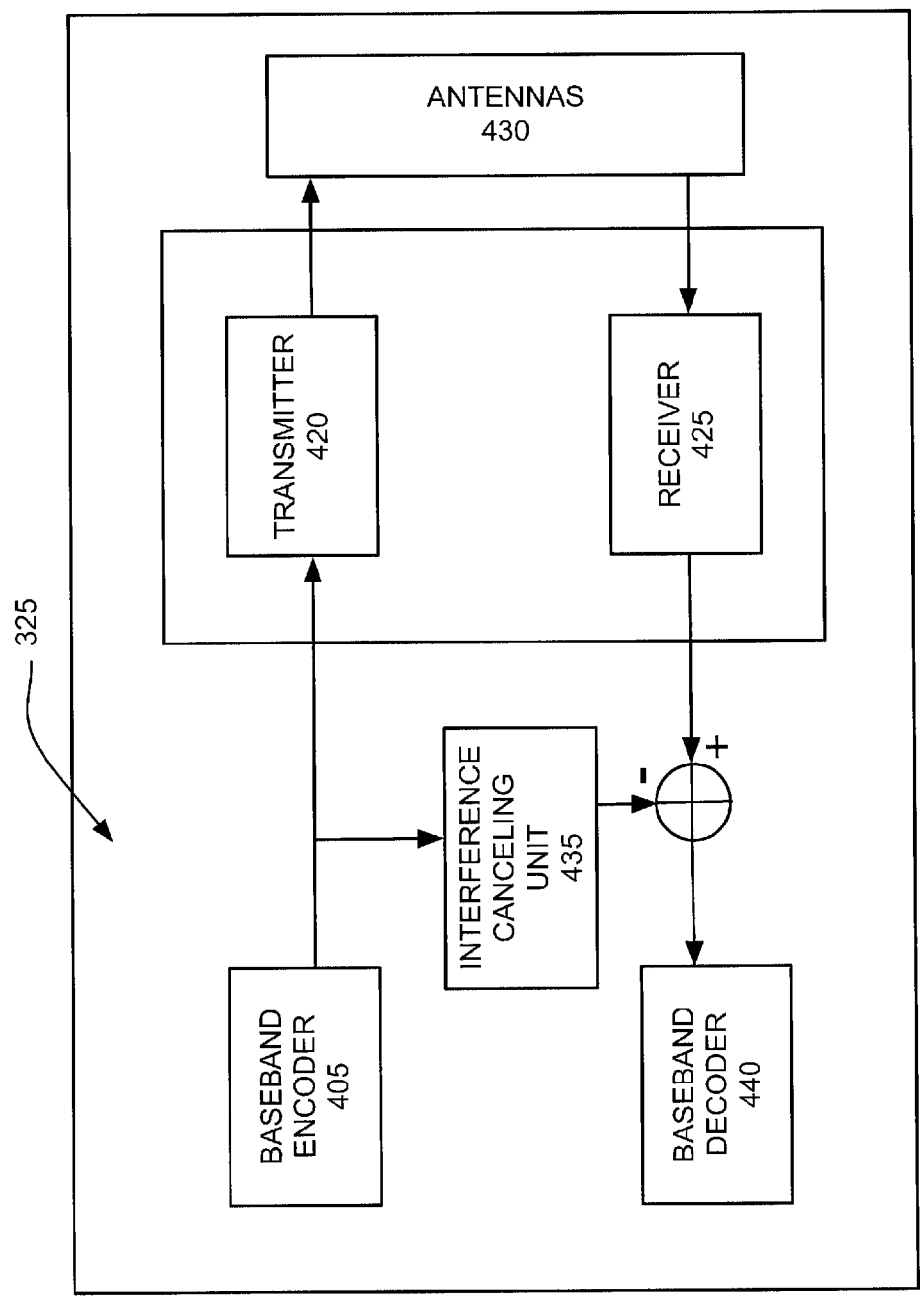
FIG. 4 is a block diagram of an exemplary implementation of the communication interface of FIG. 3, consistent with the embodiments described herein.

FIG. 4 is a block diagram of an exemplary implementation of communication interface 325 consistent with the embodiments described herein. As shown in FIG. 4, communication interface 325 may include a baseband encoder 405, a transmit coupler 410, an RF transceiver 415 having a transmitter 420 and a receiver 425, one or more antennas 430, an interference canceling unit 435, and a baseband decoder 440.

Baseband encoder 405 receives digital data from processor 310, such as a digital voice signal for transmission via RF transmitter 420. For example, baseband encoder 405 may be configured to encode a binary digital signal using a predefined encoding scheme, such as convolutional or turbo encoding to generate a signal for transmission via a physical layer, such as a radio frequency signal.

Transmitter 420 is configured to convert the encoded baseband signal into modulated RF signals based on one or more specified carrier frequencies according to allocated transmitter band specifications. For example, as briefly described above, transmitter 420 may be configured to generate RF signals using two or more aggregated bands. Transmitter 420 may include a digital to analog converter (DAC) for converting the encoded digital baseband signal for RF transmission.

Antennas 430 may be configured to output and receive RF signals, e.g., generated by transmitter 420 or for receipt by receiver 425.

Receiver 425 is configured to receive RF signals and demodulate them into a corresponding baseband signal. As described above, the received RF signals may be received via more than one aggregated frequency band. Receiver 425 may include an analog to digital converter (ADC) for generating an encoded digital baseband signal corresponding to the received RF signal(s). For the purposes of this description, it is assumed that the received RF signals(s) are received substantially simultaneously with the transmission of the RF signals from transmitter 420.

Consistent with implementations described herein, interference canceling unit 435 may be configured to receive, as inputs, the encoded baseband signals generated by baseband encoder 405 and the demodulated baseband signals output by receiver 425. In addition, interference canceling unit 435 may be configured to identify one or more potentially interfering components, such as a frequency and related harmonic frequency of the transmitted RF signal. Interference canceling unit 435 may then be configured construct a representation of the potentially interfering transmit signal and subtract or remove any the effects of the constructed representation from the received baseband signal prior to decoding by baseband decoder 440. Additional description of interference canceling unit 435 is set forth in detail below with respect to FIG. 5.

Baseband decoder 440 receives an encoded baseband signal from interference canceling unit 435. In particular, baseband decoder 440 receives a baseband signal in which interference caused by one or more transmission frequencies has been removed or subtracted. Baseband decoder 440 may be configured to decode the digital baseband signal using the predefined decoding scheme to generate a decoded digital signal. Baseband decoder 440 then outputs the decoded digital signal to processor 310.

Figure 5:
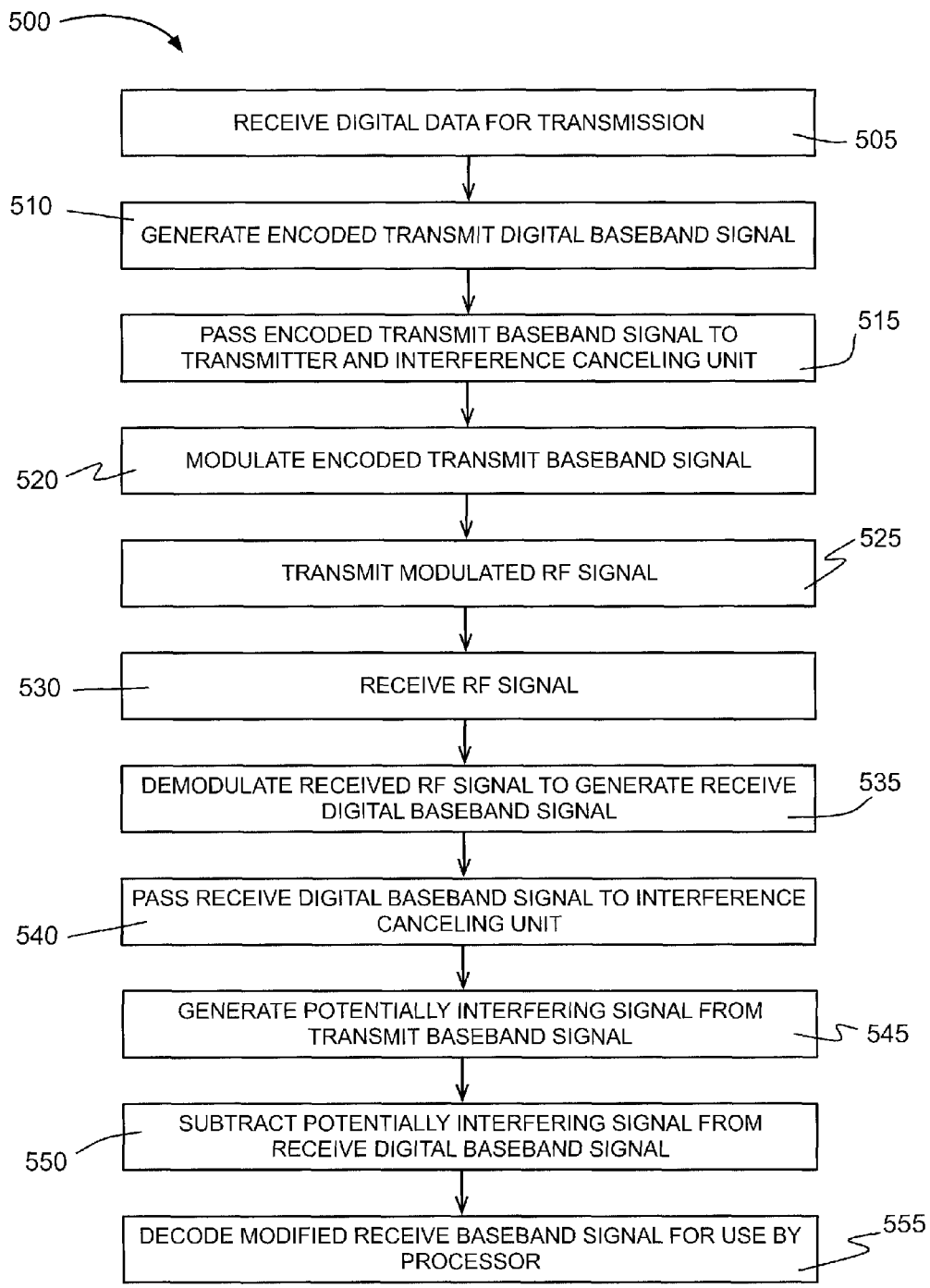
FIG. 5 is a flow diagram illustrating an exemplary process for reducing interference effects when implementing carrier aggregation.

FIG. 5 is a flow diagram illustrating an exemplary process 500 for reducing interference effects when implementing carrier aggregation. Consistent with embodiments described herein, steps of process 500 are performed by one or more components of user device 105, such as the components of communication interface 325 described above with respect to FIG. 4.

Process 500 begins, in block 505, upon receipt of a digital data signal by baseband encoder 405. For example, baseband encoder 405 may receive digital information from processor 310, such as information relating to voice communications (e.g., telephone calls, VoIP media), or other information, such as Internet-related information initiated or by an operating system or application executed by processor 310.

Baseband encoder 405 encodes the digital data for transmission via transmitter 420 to generate a transmit digital baseband signal (block 510). For example, as described above, baseband encoder 405 may encode the digital data using any of a number of encoding schemes, such as convolutional encoding, etc. Baseband encoder 405 than passes the encoded baseband data signal to both transmitter 420 and interference canceling unit 435 (block 515). Upon receipt of the encoded transmit digital baseband signal, transmitter 420 modulates the signal for output via a selected frequency band or a plurality of frequency bands, as instructed by processor 310 (block 520), and outputs the signal(s) via one or more of antennas 430 (block 530).

For example, as described above, implementations consistent with embodiments described herein support carrier aggregation technology in which uplink and or downlink transmissions may be performed using more than one frequency band.

Receiver 425 may receive one or more RF signals via one or more of antennas 430 (block 535). Consistent with the implementation of carrier aggregation, the received RF signals may be received in one or more than one frequency bands substantially simultaneously with the output of the RF signal described above in relation to transmitter 420.

Once received, receiver 425 may demodulate the received signals and generate corresponding receive digital baseband signal(s) (block 540). The receive digital baseband signal(s) are then passed from receiver 425 to interference canceling unit 435 (block 545).

Interference canceling unit 435, generates a digital version of the potentially interfering signal based on the digital baseband signal received from baseband encoder 405 (block 550). For example, interference canceling unit 435, based on frequency band information received from processor 310, may identify potentially interfering harmonic information of the one or more transmit frequency band(s) in view of the receive frequency bands. Using the example described above, interference canceling unit may determine that a third harmonic component of the data transmitted via uplink band 17 (i.e., 2212-2148 MHz) potentially interferes with data received via downlink band 4 (i.e., 2110-2155 MHz). In other implementations, an entirety of the transmit digital baseband signal is used as the basis for generating the potentially interfering signal.

Furthermore, in some embodiments, interference canceling unit 435 may also identify any relevant time delay and phase shifts occurring from transmitter 420 to receiver 425 resulting in a modification of the transmit signal(s). Based on this information, interference canceling unit 435 may generate (or reproduce) a digital version of the potentially interfering signal, which may include all or some of the information contained in the transmitted signal.

Interference canceling unit 435 then subtracts the generated potentially interfering signal from the demodulated receive digital baseband signal(s) from receiver 425 to generate a modified receive digital baseband signal(s) (block 555). For example, successive or parallel interference cancelling (SIC/PIC) receivers may be implemented to remove or subtract the effects of the generated interference signal from the first signal from the digital baseband signal.

In some implementations, only the receive digital baseband signal(s) corresponding to the potentially interfering frequency bands may be subjected to the interference canceling. For example, assume that user device 105 is configured to operate using uplink band 17 and downlink bands 4 and 17. As described above, in this scenario, the third harmonic component of the data transmitted via uplink band 17 may interfere with downlink band 4, however no component of uplink band 17 interferes with downlink band 17. Accordingly, in some implementations, only the receive digital baseband signal corresponding to downlink band 4 (i.e., the potentially interfered with frequency band) are subjected to interference canceling as described above.

In any event, the modified receive digital baseband signal is then decoded by baseband decoder 440 for use by processor 310 (block 560).

Consistent with embodiments described herein, the above-described transmitter-based interference may be combined with other types of known interference canceling, such as multipath interference, interference from other devices, etc. In some embodiments, the above-described transmitter-based interference canceling may be performed as an initial interference canceling upon which additional interference processing may be performed.

Systems and devices consistent with the aspects described herein may experience significantly reduced transmitter-to-receiver interference, thereby improving an effective received signal-to-interference ratio for the desired signal.

Such embodiments therefore enable carrier aggregation band combinations that may otherwise be very difficult or even unrealistic to use.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings. Additionally, or alternatively, one or more functions or processes described as being performed by user device 105 may be performed by other devices, such as wireless node 115.

An embodiment can also be implemented through computer readable code/instructions stored by a storage medium. A storage medium may comprise one or more of the storage media described above in relation to memory/storage 315. The storage medium may also comprise other data and/or information, such as a data file, a data structure, a program module, an application, etc. Computer readable code may comprise both machine code, such as produced by a compiler, and files comprising higher level code that may be executed by a computational device using, for example, an interpreter.

The flowchart and blocks illustrated and described with respect to FIG. 5 illustrate an exemplary process according to an exemplary embodiment. However, according to other embodiments, the function(s) or act(s) described with respect to a block or blocks may be performed in an order that is different than the order illustrated and described. For example, two or more blocks may be performed concurrently, substantially concurrently, or in reverse order, depending on, among other things, dependency of a block to another block.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The term "logic" or "component," when used in the specification may include hardware (e.g., processor 310), a combination of hardware and software (software 320), a combination of hardware, software, and firmware, or a combination of hardware and firmware.

The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the use of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction disclosed in the specification should be construed as critical or essential to the embodiments described herein unless explicitly described as such.

The invention claimed is:

1. A wireless communication interface for an electronic device, comprising:
    a baseband encoder that encodes a transmit digital baseband signal;
    a transmitter that transmits the encoded transmit digital baseband signal as a corresponding transmit radio frequency signal via an antenna assembly of the electronic device on an uplink band;
    a receiver that receives radio frequency signals on each of a first downlink band and a second downlink band via the antenna assembly and generates corresponding encoded receive digital baseband signals for the first and second downlink bands;
    an interference cancelling unit that subjects fewer than all downlink bands to interference cancelling by generating a correction signal from the encoded transmit digital baseband signal, and subtracting the correction signal from the encoded receive digital baseband signal corresponding to the first downlink band and not from the encoded receive digital baseband signal corresponding to the second downlink band, outputs of the interference cancelling unit comprising an interference corrected version of the encoded receive digital baseband signal corresponding to the first downlink and an unmodified version of the encoded receive digital baseband signal corresponding to the second downlink band; and
    a baseband decoder that decodes the interference corrected version of the encoded receive digital baseband signal corresponding to the first downlink and the encoded receive digital baseband signal corresponding to the second downlink band.

2. The wireless communication interface for an electronic device of claim 1, wherein the uplink band is not in the same frequency band as the first downlink band.

3. The wireless communication interface for an electronic device of claim 1, wherein the uplink band is in the same frequency band as the second downlink band.

4. The wireless communication interface for an electronic device of claim 1, wherein the transmitted radio frequency signal on the uplink band has at least one harmonic in an interfering frequency for the first downlink band.

5. The wireless communication interface for an electronic device of claim 1, wherein the interference canceling unit generates the correction signal by identifying at least one of a time delay or a phase shift occurring in a radio frequency pathway from the transmitter to the receiver.

6. The wireless communication interface for an electronic device of claim 1, wherein the electronic device comprises a mobile user equipment having at least one of mobile telephone capabilities or data network capabilities.

7. The wireless communication interface for an electronic device of claim 1, wherein the electronic device supports carrier aggregation of more than one carrier frequency band for at least one of uplink or downlink.

8. A method of conducting wireless communications in an electronic device, comprising:
    encoding a transmit digital baseband signal;
    transmitting the encoded transmit digital baseband signal as a corresponding transmit radio frequency signal via an antenna assembly of the electronic device on an uplink band;

receiving radio frequency signals on each of a first downlink band and a second downlink band via the antenna assembly and generating corresponding encoded receive digital baseband signals for the first and second downlink bands;

subjecting fewer than all downlink bands to interference cancelling by generating a correction signal from the encoded transmit digital baseband signal, and subtracting the correction signal from the encoded receive digital baseband signal corresponding to the first downlink band to produce an interference corrected version of the encoded receive digital baseband signal corresponding to the first downlink and not from the encoded receive digital baseband signal corresponding to the second downlink band to maintain an unmodified version of the encoded receive digital baseband signal corresponding to the second downlink band; and decoding the interference corrected version of the encoded receive digital baseband signal corresponding to the first downlink and the encoded receive digital baseband signal corresponding to the second downlink band.

9. The method of conducting wireless communications in an electronic device according to claim 8, wherein the uplink band is not in the same frequency band as the first downlink band.

10. The method of conducting wireless communications in an electronic device according to claim 8, wherein the uplink band is in the same frequency band as the second downlink band.

11. The method of conducting wireless communications in an electronic device according to claim 8, wherein the transmitted radio frequency signal on the uplink band has at least one harmonic in an interfering frequency for the first downlink band.

12. The method of conducting wireless communications in an electronic device according to claim 8, wherein the correction signal is generated by identifying at least one of a time delay or a phase shift occurring in a radio frequency pathway from the transmitter to the receiver.

13. The method of conducting wireless communications in an electronic device according to claim 8, wherein the electronic device comprises a mobile user equipment having at least one of mobile telephone capabilities or data network capabilities.

14. The method of conducting wireless communications in an electronic device according to claim 8, wherein the electronic device supports carrier aggregation of more than one carrier frequency band for at least one of uplink or downlink.

* * * * *